United States Patent
Remacha et al.

(10) Patent No.: US 10,996,180 B2
(45) Date of Patent: May 4, 2021

(54) METHOD FOR NON-DESTRUCTIVE TESTING OF A TURBOMACHINE PART

(71) Applicants: Safran, Paris (FR); Safran Aircraft Engines, Paris (FR); Centre National de la Recherche Scientifique, Paris (FR); Association Pour La Recherche Et Le Developpement Des Methodes Et Processus Industriels-ARMINES, Paris (FR)

(72) Inventors: Clément Remacha, Moissy-Cramayel (FR); Edward Romero, Moissy-Cramayel (FR); Alexiane Arnaud, Paris (FR); Henry Proudhon, Perthes (FR); Thibault Herbland, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 58 days.

(21) Appl. No.: 16/463,988

(22) PCT Filed: Nov. 28, 2017

(86) PCT No.: PCT/FR2017/053277
§ 371 (c)(1),
(2) Date: May 24, 2019

(87) PCT Pub. No.: WO2018/096302
PCT Pub. Date: May 31, 2018

(65) Prior Publication Data
US 2020/0386695 A1 Dec. 10, 2020

(30) Foreign Application Priority Data
Nov. 28, 2016 (FR) ...................... 1661602

(51) Int. Cl.
*G01N 23/207* (2018.01)
*G01N 23/205* (2018.01)
*G01N 23/2055* (2018.01)

(52) U.S. Cl.
CPC ....... *G01N 23/207* (2013.01); *G01N 23/2055* (2013.01); *G01N 2223/0566* (2013.01); *G01N 2223/426* (2013.01); *G01N 2223/604* (2013.01)

(58) Field of Classification Search
CPC ............. G01N 23/2055; G01N 23/207; G01N 2223/426; G01N 2223/604
See application file for complete search history.

(56) References Cited

U.S. PATENT DOCUMENTS

2010/0239068 A1 9/2010 Belassel et al.
2011/0038457 A1* 2/2011 Huang ................ G01N 23/207 378/73
2017/0089845 A1* 3/2017 Cernatescu ...... G01N 23/20091

FOREIGN PATENT DOCUMENTS

| CA | 2 544 464 | 10/2007 |
| FR | 2 636 141 | 3/1990 |

* cited by examiner

*Primary Examiner* — Mark R Gaworecki
(74) *Attorney, Agent, or Firm* — Blank Rome LLP

(57) ABSTRACT

A method for controlling the crystallographic orientation of at least one grain of a turbo engine part. The method includes emitting a beam of electromagnetic radiation through an elementary volume of the part and record diffraction information on the electromagnetic radiation passing through the part. This step is repeated on a given area of the part. The method further includes determining the crystal spatial orientation of each of said elementary volumes and deducing the presence of at least one first crystallographic grain for which the elementary volumes are oriented according to the same crystallographic orientation. The method further (Continued)

includes calculating the angular difference between the crystal spatial orientation of said first grain and a predetermined direction taken from the part and comparing it to a first predetermined threshold value and determining a state of use of the part.

12 Claims, 2 Drawing Sheets

METHOD FOR NON-DESTRUCTIVE TESTING OF A TURBOMACHINE PART

CROSS-REFERENCE TO RELATED APPLICATIONS

This application is a national stage of International Application No. PCT/FR2017/053277 filed on Nov. 28, 2017, which claims the benefit of French Patent Application No. 1661602, filed on Nov. 28, 2016, the contents of each of which are incorporated herein by reference.

This invention concerns a method for the non-destructive control of the internal structure of a part, more particularly the crystal orientation of the grains of matter of a turbo engine part.

Turbo engine parts, in particular turbine blades, whether moving or fixed, are subject to high mechanical stresses during turbo engine operation. The blades must therefore be very resistant to prevent their deterioration and the generation of debris that could impact the proper operation of the turbo engine. These blades have a monocrystalline structure, the grain growth being controlled by a grain selector. These blades have a complex geometry containing internal cavities to ensure cooling and have a monocrystalline structure, grain growth being controlled by a grain selector.

Before the blades are mounted in the turbo engine, it is usual to carry out a series of control operations to ensure that the blades are manufactured according to specifications.

This can be done by determining the orientation of the grains of matter of the blade, also called crystal orientation, and by searching for foreign grains in the blade. Indeed, it is known that the more identical or almost identical the orientation of the different grains, the more resistant the blade is.

A foreign grain in the blade may occur during the process of manufacturing the monocrystalline blade or during the heat treatment phases. It is a part of the blade, of variable size, whose crystalline orientation is different from the growth orientation. A foreign grain appears randomly in the blade, so it can be placed on the surface of the blade, touching the outer walls, or remain in the inner cavities of the blade.

One known method to control grain orientation is to chemically attack the blade and then to observe the blades in a solution. A grain disorientation, i.e. a different grain orientation, on the blade will be visible by a change in the a change in the reflection of light on the blade, and therefore a more or less clear area on the blade.

This method is satisfactory for the external control, i.e. the surface condition, of the blade but the control of the internal structure of the blade can only be done by cutting the part which therefore implies the destruction of the part. Thus, for series production, the control of the internal crystalline structure of the blades is only carried out during the industrialization of the part and the implementation of control of the manufacturing process.

However, turbine blades have more and more complex internal cavities, which leads to a significant probability of internal grains appearing, implying a risk of early blade ageing. Therefore, individual non-destructive control of the blades is becoming increasingly important.

It should be noted that the change in orientation of the grains of matter of the blade is achieved by an angular shift with respect to a theoretical orientation corresponding to the crystal growth axis controlled by a grain selector. This growth axis corresponds to the engine's stacking axis and extends radially with respect to the rotation axis.

The invention more particularly aims at providing a simple, efficient and cost-effective solution to this problem.

To this end, the invention proposes a method for controlling the crystal orientation of at least one grain of a turbo engine part, comprising the steps of:
a) emitting a beam of electromagnetic radiation through an elementary volume of the part and record diffraction information on the electromagnetic radiation passing through the part;
b) repeating step a) on a given area of the part,
c) determining the crystal spatial orientation of each of said elementary volumes and deducing the presence of at least one first crystallographic grain for which the elementary volumes are oriented according to the same crystallographic orientation;
d) calculating the angular difference between the crystal spatial orientation of said first grain and a predetermined direction taken from the part and comparing it to a first predetermined threshold value;
e) determining a state of use of the part.

In contrast to the previous technique, which only carries out an analysis of the surface of the part, the invention proposes to carry out a control of the internal structure of the part by analysing an electromagnetic radiation beam diffracted through the part in a plurality of different locations on the part, i.e. in a given area opposite the means of emitting electromagnetic radiation. It should be noted that electromagnetic radiation can pass through the different internal walls or partitions of the part, which can be formed inside a blade. The diffraction pattern obtained makes it possible to deduce the presence of crystallographic grains on the part and to determine their individual orientation. To determine a state of use of the part, for example, whether the part can be used or must be scrapped. The invention proposes to compare the crystal orientation of at least one grain with a predetermined direction of the part, which may correspond, for example, to a direction in which the grain of matter should extend in an ideal/theoretical situation. In practice, from the two-dimensional information obtained through the diffracted beam, information relating to the spatial orientation of the blade grain(s) is obtained.

The term "high energy" refers to energies above 100 KV such as X-rays or gamma rays for example. Radiation that cannot pass through the part is excluded here.

According to another characteristic, the method also includes the following steps:
i. identifying in the given area the presence of at least a first and a second distinct crystallographic grain from the diffraction information;
ii. determining a spatial orientation of said second grain of the part from the diffraction information;
iii. calculating the angular deviation between the spatial orientation of said second grain and said predetermined direction of the part and comparing it to the first predetermined threshold value;
iv. calculating the angular difference between the spatial orientation of said first grain and the spatial orientation of said second grain and comparing it to a second predetermined threshold value;
v. determining a state of use of the part in steps d), iii) and iv).

According to the invention, the orientation differences between two grains can also be taken into consideration, which allows a decision to be made about the state of use of the part based on a relative state between two grains of the part.

It is also understood that the invention can take into account the orientation of all crystallographic grains of the part. To this end, it is sufficient to measure an angular deviation between the crystal spatial orientation of each of the grains and the predetermined direction taken on the part, each angular deviation thus measured being compared to the first predetermined threshold value. In addition, a two-to-two comparison between each pair of grains can be made as described in relation to steps i to v above.

In a practical embodiment of the invention, the first predetermined threshold value is between −15° and 15°. The second predetermined threshold value can be between −12° and 12°.

Preferably, the determination of the state of use results in scrapping the part if one of the deviations is greater than a predetermined threshold to which it is compared.

Advantageously, the identification of the presence of a grain is performed by comparing a diffraction image of the radiation that has passed through the part with a database containing reference diffraction images corresponding to known grain orientations in a part, preferably of the same type as the part being analysed. In this first approach, it would be possible to use a correlation function to establish a similarity between the diffraction image obtained and a database diffraction image for which the grain orientation is known.

It is still possible to perform peak detection on the diffraction image and compare the peak position with a database of reference positions for known peaks whose crystal orientation is known.

Reference diffraction images can be diffraction images obtained by experimentation on real parts or on parts digitally simulated from a crystallographic point of view. Preferably, the diffraction information consists of a diffraction image obtained from the beam diffracted through the part.

Advantageously, the electromagnetic radiation beam is an X-ray beam.

According to another characteristic, all crystallographic grains in the given area of the part are identified, and the given area of the part can correspond to the entire part.

The invention will be better understood and other details, characteristics and advantages of the invention will become readily apparent upon reading the following description, given by way of a non limiting example with reference to the appended drawings, wherein.

As a reminder, the term "grain" refers to an area where atoms are perfectly ordered according to a given crystallographic arrangement.

Figure 1:
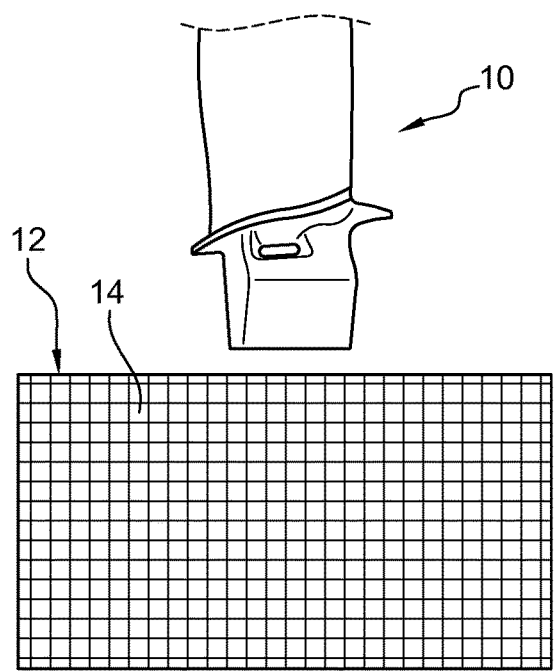
FIG. 1 is a schematic perspective view of a turbine blade having an internal structure comprising a single grain.
Figure 2:
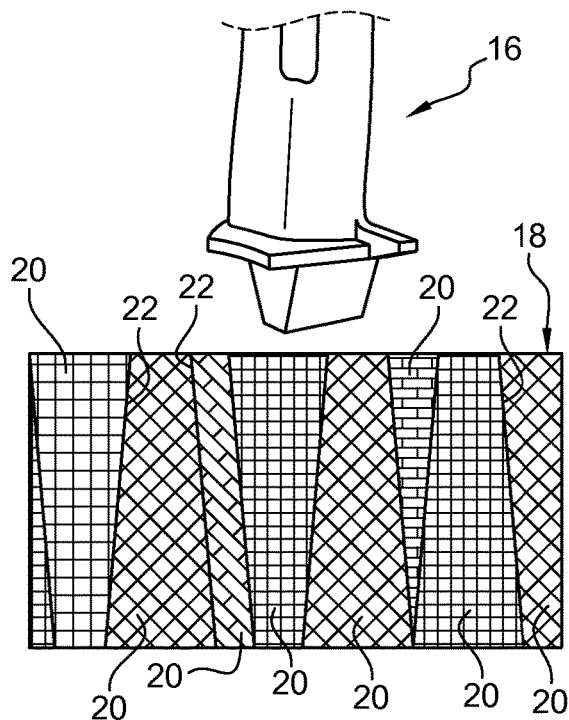
FIG. 2 is a schematic perspective view of a turbine blade having an internal structure comprising a plurality of grains.
Figure 3:
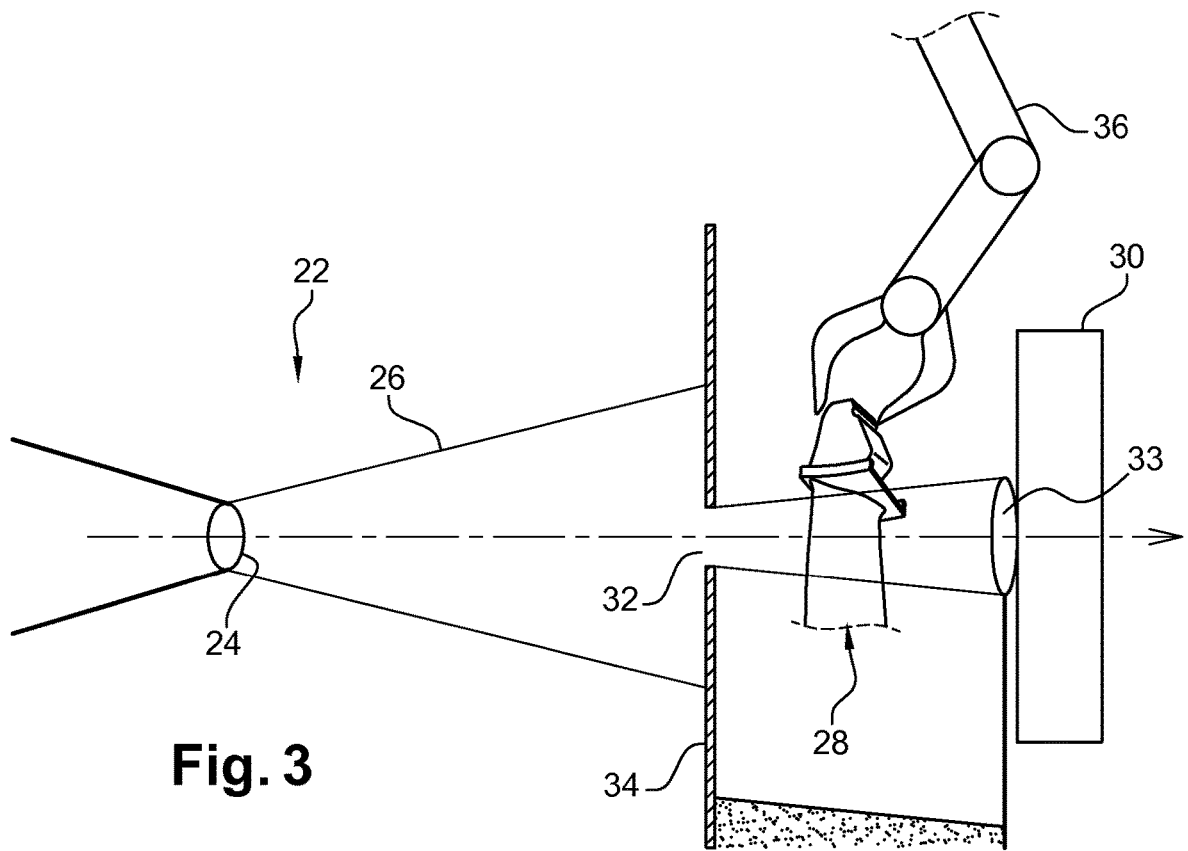
FIG. 3 is a schematic representation of a device for obtaining a diffraction pattern of electromagnetic radiation through a part to be controlled.

FIG. 1 shows a turbine blade 10 (top) and the internal structure 12 (bottom) of this blade 10, which includes a single grain 14. FIG. 2 shows a turbine blade 16 (top) and its internal structure 18 with a foreign grain 20. This foreign grain 20 is delimited with the theoretical internal structure 18 by a grain seam 22.

As indicated above, the invention proposes a method and a device for analysing the micro-structure of a blade in order to give information on the manufacturing conformity of the part and thus deduce whether or not the blade is suitable for use in a turbo engine, i.e. whether it is suitable for withstanding mechanical stresses in operation.

To this end, the device 22 includes a high-energy electromagnetic radiation source 24, more particularly an X-ray source capable of emitting a beam 26 towards a blade 28 to be controlled. It also includes means for two-dimensional collection and recording 30 of the beam diffracted through part 28. A first mask 32 is interposed between the radiation source 24 and part 28 and includes an opening 34 configured so that only a portion of part 28 is exposed to incident radiation, representing the measurement region. This first mask 32 also limits parasitic reflections. A second mask 33 made of a material capable of strongly absorbing radiation from the source will be aligned with aperture 34 in order to remove the direct beam (order 0) from the recorded signal. The control area of part 28 can be positioned in the beam by means of a computer-controlled gripper arm 36. The assembly used in this case is a Laue type transmission assembly.

Figure 5:
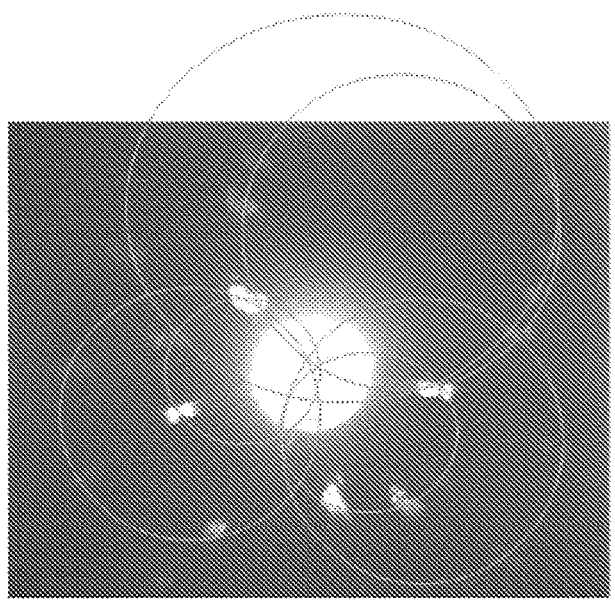
FIG. 5 is an illustration of a diffraction image obtained through the part in FIG. 4.

Device 22 according to the invention is thus used as follows. An X-ray beam 26 passes through part 28 in an elementary volume of the part and is collected by a two-dimensional digital sensor with indirect detection (typically a flat digital sensor with a caesium iodide scintillator) or direct detection (RX photon counter). The information obtained is diffraction information on the X-ray beam that can be represented as a diffraction image (FIG. 5). This diffraction image represents an example of a diffraction pattern obtained when blade 38 contains a single crystallographic grain.

From such a diffraction image, it is possible to determine the number of grains in the area of the part observed by X-rays. This identification can be done by comparison with reference images stored in a database, these reference images corresponding to known grain orientations in a part of the same type as the part being analysed. Reference diffraction images are diffraction images obtained by experimentation on real parts or on digitally simulated parts.

After determining the spatial orientation of the elementary volume of blade 38, the method then consists in moving the part by means of arm 36 in order to scan a given area of the part or, for example, the entire part when one wishes to control its entirety. This provides a plurality of diffraction information at each of the part positions and it is possible to determine the crystal orientation at each of said part locations.

The elementary volumes with identical crystal orientation are then determined to form a given grain, for example a first grain.

Figure 4:
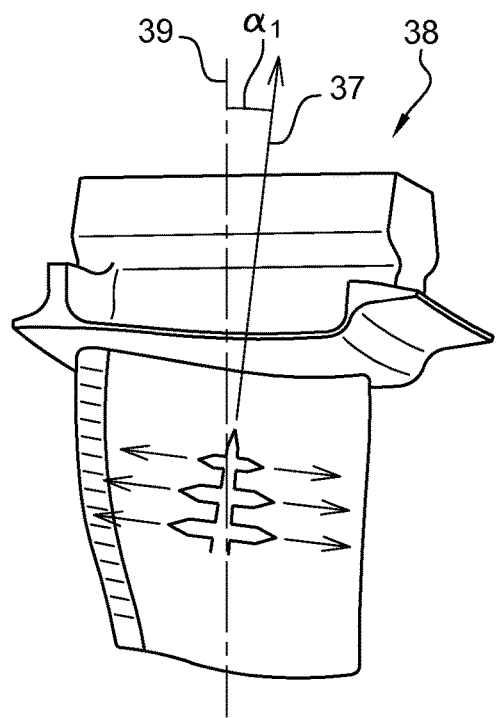
FIG. 4 is a schematic representation of a turbine blade having comprising a single grain.

The angular deviation between the angular orientation 37 obtained on blade 38 for said identified volume of interest and the longitudinal direction 39 of the blade, i.e. the direction extending from the foot to the top of the blade and substantially corresponding to the radial direction, i.e. perpendicular to the axis of rotation of the rotors of the turbo engine (FIG. 4), is then calculated.

This angular deviation $\alpha_1$ is compared to a first predetermined threshold value which can be in the range of −15° to 15°. Indeed, beyond this range of values, the mechanical stresses applied to the blade during operation would be too high for such a grain, which could damage the blade.

If the angular deviation $\alpha_1$ is higher than the first threshold value, then the controlled blade should be discarded as this indicates that the one and only grain of the blade is too strongly misaligned with the desired ideal orientation, which is that of the blade's longitudinal axis. Thus, in such a case, the blade would be subjected to excessive mechanical stresses during operation compared to the orientation of the atoms.

Figure 6:
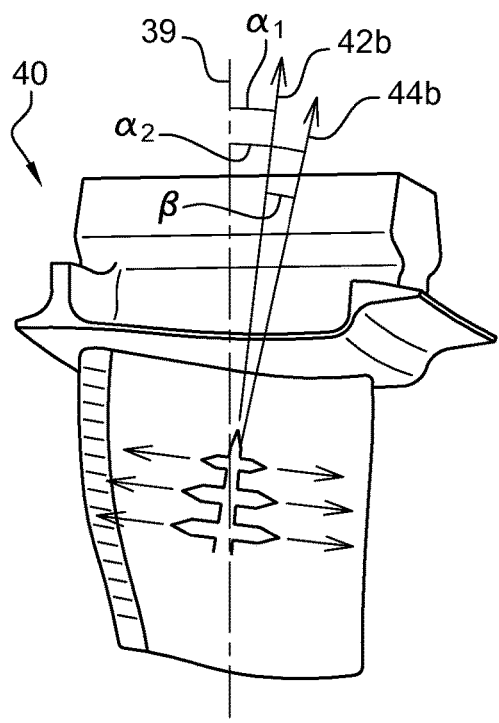
FIG. 6 is a schematic representation of a turbine blade comprising two grains.
Figure 7:
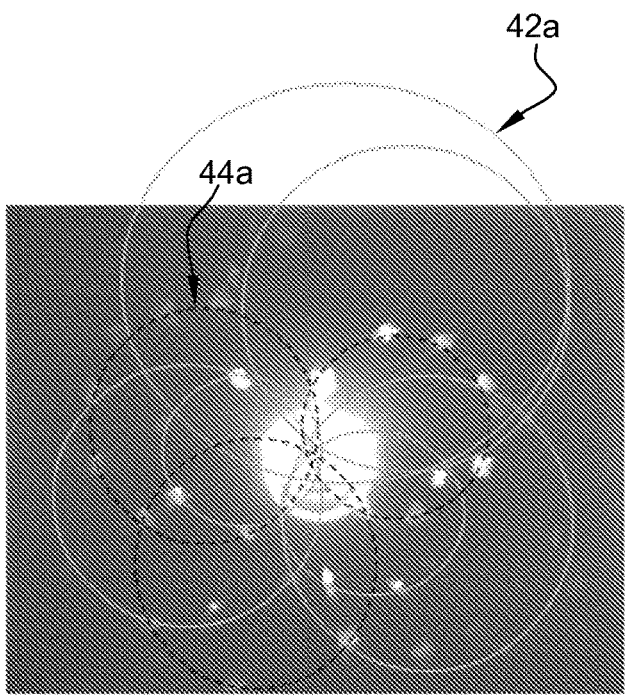
FIG. 7 is an illustration of a diffraction image obtained through the part in FIG. 6.

In a second possible configuration of a blade 40 with two different grains (FIG. 6), a diffraction pattern on the diffraction image (FIG. 7) that is different from the one obtained for the blade with a single grain is then obtained. This image includes two series of circles 42a, 44a, the first series of circles 42a (solid lines) corresponds to a first grain of the part and the second series of circles 44a (dotted lines) corresponds to a second grain of the blade 40.

To determine whether the blade, which comprises two grains 42, 44, whereas in theory it should comprise only one grain oriented in the longitudinal direction, the method according to the invention therefore consists in determining the spatial orientation 42b, 44b of the first grain 42 and the second grain 44 and measuring the angular deviation $\alpha_1$ and $\alpha_2$ of each of the orientations 42b, 44b from the longitudinal direction 39. If one of the two angular deviations $\alpha_1$ and $\alpha_2$ is higher than the first threshold value, then the part should be discarded. However, in the case where these two angular deviations $\alpha_1$ and $\alpha_2$ are lower than the first predetermined threshold value, then the angular deviation $\beta$ must be calculated between the spatial orientation of said first grain and the spatial orientation of said second grain and to compare this new angular deviation $\beta$ which can be described as inter-grain deviation, with a second predetermined threshold value. The angular deviation $\beta$ should be less than the second predetermined threshold value for the part not to be scrapped.

With the method according to the invention, it is thus possible to determine whether the spatial orientation of a grain is acceptable with respect to the nominal orientation that the grain should have and whether the presence of several grains of different orientations is also acceptable.

The method according to the invention has been described with reference to only one part of the blade, however, it is understood that the method can be repeated successively over the entire height of the part, thus performing a non-destructive control of the part over its entire height.

It should be noted that in order to be able to perform the above angular deviation measurements from the spatial orientations of the grains, a spatial orientation of each of the grains is first obtained in the collection means (or sensor) marker 30. A change of marker of the spatial orientation of the collection means marker in the gripper arm marker 36 is then made, then a change of marker of the gripper arm in the marker of part 38, 40.

The invention claimed is:

1. A method for controlling the crystal orientation of at least one crystallographic grain of a turbo engine part, the method comprising the steps of:
   a) emitting a beam of electromagnetic radiation through a volume of a plurality of elementary volumes of the part and record diffraction information on the electromagnetic radiation passing through the part;
   b) repeating step a) on other volumes of the plurality of elementary volumes of the part;
   c) determining the crystal spatial orientation of each of said plurality of elementary volumes and deducing the presence of at least one first crystallographic grain for which the plurality of elementary volumes are oriented according to the same crystallographic orientation;
   d) calculating the angular difference between the crystal spatial orientation of said first grain and a predetermined direction taken from the part and comparing it to a first predetermined threshold value; and
   e) determining a state of use of the part.

2. The method according to claim 1, which further comprises the following steps:
   i) identifying in the volume of the plurality of volumes the presence of at least a first and second distinct crystallographic grain from the diffraction information;
   ii) determining a spatial orientation of said second grain of the part from the diffraction information;
   iii) calculating the angular deviation between the spatial orientation of said second grain and said predetermined direction of the part and comparing it to the first predetermined threshold value;
   iv) calculating the angular difference between the spatial orientation of said first grain and the spatial orientation of said second grain and comparing it to a second predetermined threshold value;
   v) determining a state of use of the part in steps d), iii) and iv).

3. The process according to claim 1, wherein the first predetermined threshold value is between about −15° and about 15°.

4. The method according to claim 1, wherein the second predetermined threshold value is between about −12° and about 12°.

5. The method according to claim 1, wherein the determination of the state of use results in scrapping the part if one of the deviations is greater than a predetermined threshold to which it is compared.

6. The method according to claim 1, wherein the identification of the presence of a grain is carried out by comparing a diffraction image of the radiation that has passed through the part with a database comprising reference diffraction images corresponding to known orientations of grains in a known part, or by comparing the position of the peaks on the diffraction image with known peak reference positions contained in a database.

7. The method according to claim 6, wherein the reference diffraction images are diffraction images obtained by experimentation on real parts or on parts digitally simulated from a crystallographic point of view.

8. The method according to claim 6, wherein the known part is and the part analysed are of a same type.

9. The method according to claim 1, wherein the diffraction information consists of a diffraction image obtained from the beam diffracted through the part.

10. The method according to claim 1, wherein the part is a blade of a turbo engine turbine, the predetermined direction taken on the part being the longitudinal direction extending between the foot and the top of the blade.

11. The method according to claim 1, wherein the beam of electromagnetic radiation is an X-ray beam.

12. The method according to claim 1, wherein an identification of all crystallographic grains of the given area of the part is carried out, the given area of the part possibly corresponding to the entire part.

* * * * *

UNITED STATES PATENT AND TRADEMARK OFFICE
CERTIFICATE OF CORRECTION

| | |
|---|---|
| PATENT NO. | : 10,996,180 B2 |
| APPLICATION NO. | : 16/463988 |
| DATED | : May 4, 2021 |
| INVENTOR(S) | : Clément Remacha et al. |

It is certified that error appears in the above-identified patent and that said Letters Patent is hereby corrected as shown below:

On the Title Page (73), Assignee, is corrected to read as follows:
(73) Assignee: Safran, Paris (FR); Safran Aircraft Engines, Paris (FR) Centre National de la Recherche Scientifique, Paris (FR); Association pour la Recherche et le Développement des Méthodes et Processus Industriels - ARMINES, Paris (FR)

Signed and Sealed this
Sixth Day of August, 2024

Katherine Kelly Vidal
*Director of the United States Patent and Trademark Office*